United States Patent [19]

Franco et al.

[11] 4,103,567

[45] Aug. 1, 1978

[54] DIFFERENTIAL PINION ASSEMBLY, ESPECIALLY FOR MOTOR VEHICLES

[75] Inventors: Colanzi Franco; Sapello Guido, both of Turin, Italy

[73] Assignee: SKF Industrial Trading and Development Company N.V., Jutphaas, Netherlands

[21] Appl. No.: 695,857

[22] Filed: Jun. 14, 1976

[30] Foreign Application Priority Data

Jun. 20, 1975 [IT] Italy ............................. 68591 A/75

[51] Int. Cl.² ............................................ F16H 1/38
[52] U.S. Cl. ..................................... 74/710; 308/174
[58] Field of Search ................... 74/710, 710.5, 711, 74/713, 715; 308/174, 175

[56] References Cited

U.S. PATENT DOCUMENTS

| | | | |
|---|---|---|---|
| 783,168 | 2/1905 | Baker | 74/713 |
| 1,322,689 | 11/1919 | Griffing | 74/713 |
| 1,736,836 | 11/1929 | Rayburn | 74/710 |
| 2,408,926 | 10/1946 | Griffith | 74/713 |
| 2,548,258 | 4/1951 | Griffith | 74/713 |
| 2,557,937 | 6/1951 | Buckendale | 74/713 |
| 2,566,601 | 9/1951 | Cousins | 74/713 |
| 2,724,234 | 11/1955 | Meyer | 308/174 X |
| 3,495,479 | 2/1970 | Rass | 74/710 X |

FOREIGN PATENT DOCUMENTS 160,636  1/1964  U.S.S.R. ................................ 74/710.5

Primary Examiner—Benjamin W. Wyche
Assistant Examiner—Carl F. Pietruszka
Attorney, Agent, or Firm—H. Dale Palmatier

[57] ABSTRACT

A differential pinion assembly, especially suitable for use in a motor-vehicle transmission is described.

This assembly in adapted to transmit the movement to two axle-shafts, has a simple and very compact structure and the friction between the relative movement members is substantially a rolling friction.

This assembly comprises a box in the inside of which rotates a differential carrier actuated by a driving toothed pinion engaging with a crown gear solid with the differential carrier. The differential carrier carries satellite gears rotatable relative to it and mates with corresponding planetary gears with each of which one of the aforesaid axle-shafts is solid. The main feature of this assembly is that of comprising a first row of rolling elements interposed and coupled between each of said planetary gears and the above mentioned differential carrier, as well as a second row of rolling elements interposed and coupled between said planetary gear and said box.

1 Claim, 2 Drawing Figures

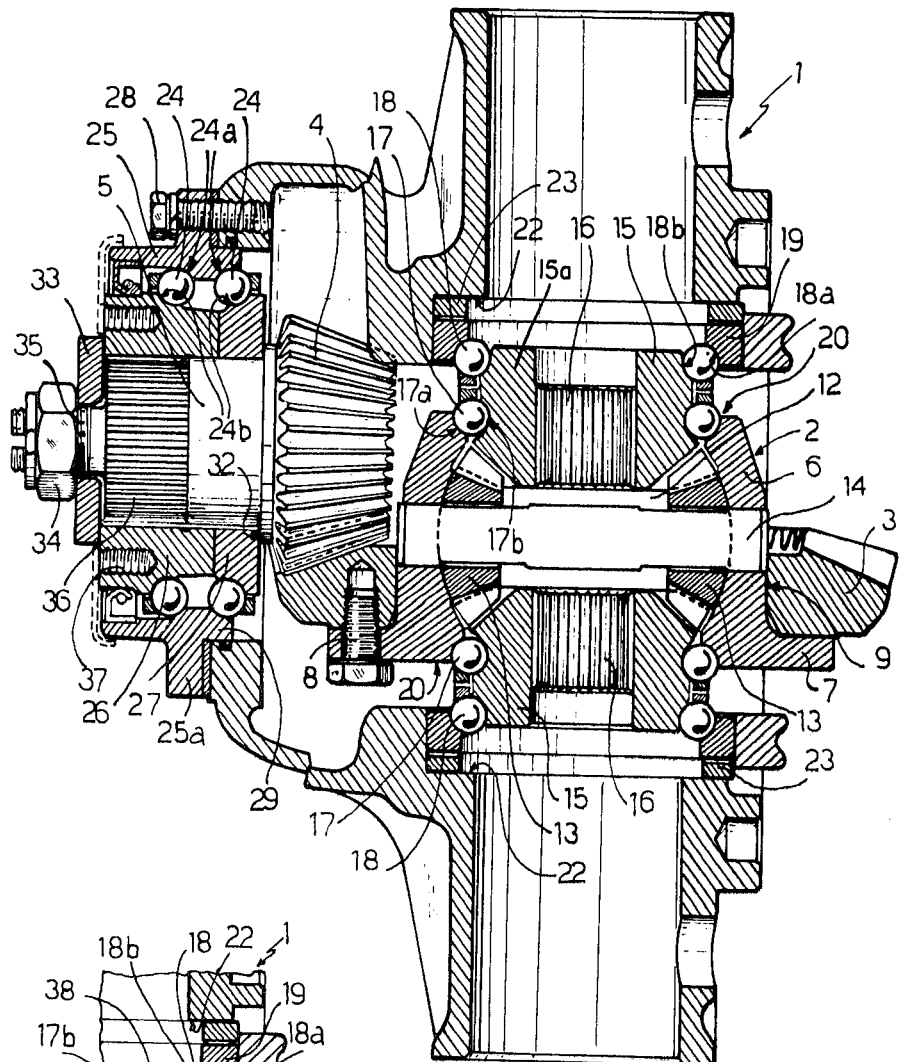

DIFFERENTIAL PINION ASSEMBLY, ESPECIALLY FOR MOTOR VEHICLES

BACKGROUND OF THE INVENTION

The present invention refers to a differential pinion assembly, especially suitable for use in a motor-vehicle transmission, having a simple and very compact structure and where the friction between the relative movement members is substantially a rolling friction.

The differential units for motor-vehicles are adapted to transmit the movement from the driving shaft to the two axleshafts and notoriously comprise a box in the inside of which rotates a differential carrier actuated by a toothed driving pinion engaging with a crown gear solid with the differential carrier. The differential carrier is supported during rotation on the box by means of a pair of antifriction bearings, usually taper roller bearings onto which the radial and axial loads applied to the differential carrier by the pinion are discharged. Inside the differential carrier are located satellite gears, rotatable relative to the same and mating with two planetary gears with each of which an axle shaft is solid. The aforesaid satellite and planetary gears are normally rotatable with sliding friction, the former round a pin located inside the differential carrier, the latter in appropriate seats of the differential carrier. The driving toothed pinion is solid with a shaft, this too supported by a pair of antifriction bearings, normally taper roller bearings, and transmission of the movement from the driving shaft to the latter shaft takes place by means of two flange half-couplings, one of which, fitted with a splined hub, mates with the pinion shaft.

The differential units of the above described type show some inconveniences.

First of all, their structure is rather complex, and their assembling and disassembling involves lengthy and delicate operations. In effect, since for supporting the differential carrier and the pinion shaft normal antifriction bearings are used, when fitting these special measures and precautions are to be taken, and seats, shoulders, locking and adjusting elements as well as other parts of like kind must be provided. Moreover, the relative movement between some parts of the unit, for instance between the planetary gears and the differential carrier is pure sliding movement, with rather high friction values. Lastly, during operation unbalancing centrifugal forces may arise due to the presence of eccentricity in the fitting of the two above mentioned half-couplings that connect the transmission shaft and the unit.

SUMMARY OF THE INVENTION

The object of this invention is to provide a differential pinion assembly which is adapted to transmit the movement to two axle-shafts and which is substantially exempt from the above mentioned inconveniences.

The differential pinion assembly according to the invention, comprises: a box in the inside of which rotates a differential carrier actuated by a driving toothed pinion engaging with a crown gear solid with the differential carrier, said differential carrier carrying satellite gears rotatable relative to it and mating with corresponding planetary gears with each of which one of the aforesaid axle-shafts is solid, a first row of rolling elements interposed and coupled between each of said planetary gears and the above mentioned differential carrier, and a second row of rolling elements interposed and coupled between said planetary gear and said box.

In the differential pinion assembly according to the invention the aforesaid toothed pinion is solid with a driving shaft supported during its rotation relative to the box by means of a pair of row of rolling elements rolling on raceways provided on an annular element fastened to said box: according to a further characteristic of the invention, the assembly comprises two rings fitted to said shaft, on each of which a raceway is provided for said rolling elements, said rings being brought into contact with each other and against a shoulder of the shaft with the employment of thrust means, and the ring located farther away from the pinion being equipped with axial grooves adapted to mate with corresponding axial projections of said shaft and with axial holes apt to make possible the connection of the ring directly with the transmission shaft, by which the differential pinion assembly is driven.

BRIEF DESCRIPTION OF THE DRAWINGS

For a better understanding of the present invention, a description is given below, by may of example, of some particular forms of embodiment of the same with reference to the attached drawings.

FIG. 1 is a sectional view of the differential pinion assembly according to the invention.

FIG. 2 is a detail of a sectional view, similar to that of FIG. 1, of a differential pinion assembly according to a second form of embodiment of the invention.

DETAILED DESCRIPTION OF THE INVENTION

The differential pinion assembly according to the invention comprises substantially a box the whole of which is designated by numeral 1, and in the inside of which the components of the assembly are housed. The assembly comprises a differential carrier 2, rotatably mounted, as described in the following pages, in the inside of the box and on which is fixed a crown gear 3 engaging with a driving pinion 4 solid with a shaft 5 to which the movement is imparted by the transmission shaft (not shown in the figure) which provides a source of mechanical rotary power.

The differential carrier 2, which has substantially the form of a revolving solid generated by the rotation of a plane figure such as that shown in the section of FIG. 1, comprises substantially a body 6 and a flange 7, apt to make possible the fastening, for instance by means of screws 8, of the crown gear 3: the centering of this relative to the differential carrier is ensured by the mating of its inner cylindrical surface with a corresponding cylindrical surface 9 of the body 6.

In the inner recess 12 of the differential carrier are arranged satellite gears 13 rotatably mounted on a pin 14 fitted in corresponding holes of the body 6. The satellite gears engage with two planetary gears 15, each of which has a hub 15a and is adapted to be connected, coaxially by known technical means, for instance by means of grooves 16 to receive interfitting ribs or projections on a corresponding axleshaft (not shown in the figure) which must be driven by the differential pinion assembly according to the invention. A first row of rolling bearing elements 17, for instance balls, is arranged between the outer periphery of the hub of each planetary gear 15 and the differential carrier, to guide the carrier for rotation about the common axes of the planetary gears; and a second row of rolling elements 18, for instance again a row of balls, is also arranged between the outer periphery of the hub of each planetary gear and an adjacent annular element 19 which in its turn is fixed, in any convenient manner, to the box 1 of the differential pinion assembly, to guide rotation of the planetary gears with respect to the box 1.

The rolling elements of the first row 17 are adapted to roll on raceways 17a and 17b provided on the differential carrier 2 and on the hubs of planetary gears 15 respectively, and the rolling elements of the other row 18 are adapted to roll on raceways 18a and 18b, provided on the annular elements 19 and on the hubs of the planetary gears respectively. The raceways 17a on the carrier body 2 also define the annular openings through which the planetary gear hubs 15a extend. The form of the above mentioned raceways is such, that the straight lines which run through the contact points between each rolling element and its raceway and which are perpendicular to tangents of the rolling element and raceway mating surfaces, are inclined, at an oblique angle with respect to the rotation axis; or with respect to the roll angle of the planetary gears, through an angle equal to, or other than, 90°. Moreover, the inclination of the straight lines with respect to the rolling elements of the first rows 17, is opposite in direction to the inclination of the straight lines relative to the rolling elements of the second rows of balls 18. Otherwise stated, annular raceways 18a and 17a are concavely shaped to conform to the shape of the bearing elements 18 and 17. The raceways 18a and 17a are oriented to face obliquely inwardly and axially of the gear hub 15a, and such raceways are oppositely oriented so as to face obliquely in opposite axial directions. The corresponding raceways 18b and 17b on the gear hub 15a are disposed opposite raceways 18a and 17a and also concavely shaped and oriented to face obliquely outwardly and axially of the hub, Such raceways 18b and 17b include portions which are oppositely oriented to face obliquely in opposite axial directions. Accordingly, the such two rows of bearing elements are adapted to withstand both radial and axial loads, opposite in direction, acting on each planetary gear.

It is evident that the rolling elements of the rows 17 and 18 may be different from those described, for instance they may be taper rollers or elements having any other form: in this case the form of the surfaces of the corresponding raceways will have to be modified accordingly.

As can be seen, in the constructional arrangement contrived for supporting the differential carrier each planetary gear 15 projects axially to an appreciable extent from the body 2 of the differential carrier, because in the inside of this only the crown of such planetary gear is housed: the relevant hub portion, on which the raceways 17b and 18b are provided, is located outside the recess 12 and on a side of the relevant end face 20, which axially delimits the differential carrier.

Between each annular element 19 and the bottom 22 of the relevant seat an adjustment ring 23 is conveniently provided.

According to the invention, for supporting the shaft 5 with which the pinion 4 is solid, use is made of two rows of rolling elements 24, for instance balls, which are adapted to roll on corresponding raceways 24a and 24b, the former being provided on a tubular element 25, the latter on rings 26, 27 fitted on the shaft 5. The tubular element 25 is equipped with a flange 25a adapted to make possible its fastening, for instance by means of screws 28, to the box 1 and with an annular part 29 apt to accurately center it relative to the box. The ring 27 is thrust against a shoulder 32 of the shaft 5 and the ring 26 against the same by a washer 33 thrust in its turn by a nut 34 which is screwed into a threaded cylindrical portion 35 of the shaft. The ring 26 is equipped with axial groovings adapted to mate with corresponding axial groovings 36 of the shaft 5, so as to make such two parts torsionally solid: such ring may also show a portion of internal cylindrical surface which mates with the corresponding cylindrical surface of the shaft 5.

On the ring 26 there are provided axial holes 37 which are adapted to make possible the direct connection of such ring to the end flange of the transmission shaft (not shown in the figure) for driving the unit according to the invention. The form of the raceways 24a and 24b for the rolling elements 24 is, in this case too, such that the straight lines which run through the contact points of each rolling element with the respective raceway and which are perpendicular to tangents of the rolling element and raceway mating surfaces are inclined, with respect to the rotation axis of the shaft 5, through an angle other than a 90°-angle: moreover, the inclination of the straight lines relative to the rolling elements of a row is opposite in direction with respect to the inclination of the straight lines relative to the rolling elements of the other row.

Otherwise stated, all of the raceways 24a and 24b are annular about the rotation axis of shaft 5 and are concavely shaped as to receive the rows of rolling bearing elements 24. All of the raceways 24a and 24b are oriented in an oblique axial direction wherein the raceways 24a face obliquely inwardly, and the raceways 24b face obliquely outwardly. The two raceways 24b face obliquely in opposite axial directions and the two raceways 24a also face in oblique axial opposite directions. Accordingly, the two rows of rolling bearing elements 24 are captured between the raceways and the two rows are adapted to withstand, besides radial loads, axial loads in opposite directions acting on the shaft 5.

The above described differential unit operates as follows: First of all, the connection between the transmission shaft and the unit is ensured directly between the flange with which such shaft is normally equipped and the ring 26 without the need for using further connecting elements. In effect such flange is normally equipped with a set of peripheral holes, each of which can accommodate a screw which is turned into the holes 37 of the ring 26. Such constructional arrangement results not only in appreciably reduced overall dimensions but also in a perfect centering of the transmission shaft with respect to the shaft 5 with which the pinion 4 of the unit is solid: in effect, the ring 26 is found to be perfectly coaxial with the shaft 5 owing both to the mating of the cylindrical surfaces of the ring with those of the shaft, and to the possibility of accurately centering the above mentioned flange with respect to the ring.

During rotation of the shaft 5, driven by the ring 26, the rows of rolling elements 24 roll on the corresponding raceways 24a and 24b and the pinion 4 rotates thereby causing the differential carrier 2 to rotate as well. When such differential carrier rotates solidly with the planetary gears 15, as happens when the vehicle covers a rectilinear distance and consequently the two axle-shafts rotate substantially at the same angular speed, the rolling elements of the rows 17 rotate solidly with such differential carrier and perform no rolling movement relative to the respective raceways: under such operating conditions there is, instead, a rolling movement of the rolling elements of the rows 18 which accordingly support the differential carrier and the other parts solid with it. When instead a relative movement occurs between the planetary gears 15 and the differential carrier 2, as happens when the vehicle covers a curved path, besides a rotation of the rolling elements of the rows 18 there is also a rotation of the rolling elements of the rows 17, which consequently roll on the corresponding raceways of the differential carrier and of the planetary gears. Therefore it is apparent that the differential carrier with respect to the box is supported not directly by rolling elements but through the medium of the planetary gears 15. On the other hand, each planetary gear 15 is not supported directly on the differential carrier as on conventional type differential units, but partly on the differential carrier and partly directly on the box: in the former case through the row 17 of rolling elements and in the latter case through the row 18 of rolling elements. With such constructional arrangement, besides ensuring the support of the differential carrier by means of a very simple and compact structure, an additional advantage is obtained inasmuch as each planetary gear 15 is supported by means of rolling elements, contrary to what happens on differential units of the conventional type, wherein the planetary gears are supported by plain bearings placed directly inside the differential carrier.

In actual fact the two rows 17 and 18 of rolling elements located on either side of the differential carrier, behave as if they were one bearing or a set of bearings adapted to withstand the radial as well as axial loads acting on the differential carrier, whereas each row 17 and 18 behaves like an antifriction bearing adapted to withstand the loads, radial as well as axial, acting on each planetary gear 15. Furthermore, the unit according to the invention has very reduced overall dimensions. In effect, as clearly appears from the drawings and the description, the differential carrier 2 exhibits a very limited axial dimension, because it is not necessary to provide on its outside seats for the fitting of antifriction bearings adapted to support the differential carrier itself or to provide in the inside of it other seats adapted to accommodate the planetary gear hubs. Hence the maximum overall dimension of the unit, measured in the direction of the axis of the axle shafts, is very reduced: likewise, the maximum overall dimension measured in the direction of this orthogonal axis is also very reduced because, with the constructional arrangement according to the invention, the rows 24 of rolling elements may be very close. This is due to the fact that the inner raceways 24b of such rolling elements are provided on rings 26, 27 in direct contact with each other whereas the outer raceways 24a are provided on one tubular element 25.

FIG. 2 shows a form of embodiment of the invention slightly different from the above described form. In effect, the raceways 17b and 18b, instead of being provided directly on the planetary gears 15 are provided on rings 38 fastened to the planetary gears in any convenient manner. Similarly the raceways 17a are provided on rings 39 fastened to the differential carrier.

It clearly appears that other variations and modifications can be introduced in the constructional arrangement according to the invention without departing from the scope of the invention itself; in particular, it is possible to mount the differential carrier and the planetary gears in accordance with the principle of the invention using normal antifriction bearings instead of providing the rows 17 and 18 of rolling elements and the corresponding raceways on the differential carrier, on the planetary gears or on rings solid with such parts or with the box, as has been described in the forms of embodiment according to FIG. 1 and FIG. 2 respectively.

What we claim is:

1. A differential pinion assembly adapted to transmit rotation from a source of mechanical power to two aligned axle-shafts, comprising a box inside which a differential carrier rotates on the shaft axes and actuated by a driving toothed pinion engaging with a crown gear affixed to and concentric of the differential carrier, such differential carrier carrying satellite gears rotatable with respect to the carrier and meshing with a pair of planetary gears on the shaft axes, each of said planetary gears being adapted to be affixed to a respective one of said axle shafts, said differential carrier having an inside recess accommodating such planetary and satellite gears, and the differential carrier having a pair of aligned axial openings concentric of the shaft axes, each of said planetary gears having a hub projecting through a respective one of said openings and outwardly of the differential carrier, said planetary gears having external peripheral surfaces defining two adjacent raceways spaced axially from each other, one of said raceways guiding a first row of rolling bearing elements and the other of said raceways guiding a second row of rolling bearing elements, said first rows of rolling bearing elements on the respective planetary gear hubs also being guided in first raceways on the differential carrier and respectively located on opposite sides of the carrier at the peripheries of the axial openings to mount and carry the differential carrier on such planetary gears, and said second rows of rolling bearing elements on the respective planetary gear hubs also being guided in second raceways concentric of the planetary gear axis and formed in annular elements adjacent respective planetary gear hubs and affixed to the box and carrying the planetary gears on the box, said driving toothed pinion being solid with a driving shaft supported during rotation with respect to the box by means of a pair of rows of rolling bearing elements rolling on raceways provided in an annular element affixed to said box, the shaft having two concentric rings affixed thereto, each of said rings having a raceway for such rolling elements, said rings engaging each other and axially against a shoulder of the shaft, and one of the rings having axial grooves on its inner periphery receiving axial projections on the periphery of said shaft and also having axial holes for connection of the rings with such a source of mechanical power by which the assembly is driven.

* * * * *